(12) United States Patent  (10) Patent No.: US 8,588,978 B2
Choi et al.  (45) Date of Patent: *Nov. 19, 2013

(54) ROBOT

(75) Inventors: Byung Kwon Choi, Seoul (KR); Woo Sup Han, Yongin-si (KR); Yong Jae Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 760 days.

This patent is subject to a terminal disclaimer.

(21) Appl. No.: 12/656,022

(22) Filed: Jan. 13, 2010

(65) Prior Publication Data

US 2010/0185326 A1  Jul. 22, 2010

(30) Foreign Application Priority Data

Jan. 22, 2009 (KR) ........................ 10-2009-0005443

(51) Int. Cl.
*G05B 15/00* (2006.01)
*G05B 19/00* (2006.01)

(52) U.S. Cl.
USPC ............ 700/258; 700/250; 700/255; 700/245

(58) Field of Classification Search
USPC ............. 700/250, 255, 258, 245; 318/568.12, 318/568.13; 340/573.1; 74/89.23
See application file for complete search history.

(56) References Cited

U.S. PATENT DOCUMENTS

| | | | |
|---|---|---|---|
| 6,602,227 B1 * | 8/2003 | Cimino et al. ................. | 604/113 |
| 7,158,859 B2 * | 1/2007 | Wang et al. .................... | 700/245 |
| 7,164,970 B2 * | 1/2007 | Wang et al. .................... | 700/245 |
| 7,171,286 B2 * | 1/2007 | Wang et al. .................... | 700/248 |
| 7,204,825 B2 * | 4/2007 | Cimino et al. ................. | 604/113 |
| 7,304,581 B2 * | 12/2007 | Miyazaki et al. .......... | 340/573.1 |
| D563,443 S * | 3/2008 | Ahn et al. ..................... | D15/199 |
| D579,035 S * | 10/2008 | Kim et al. ..................... | D15/199 |
| 8,195,333 B2 * | 6/2012 | Ziegler et al. ................. | 700/259 |
| 2002/0081937 A1 * | 6/2002 | Yamada et al. ............... | 446/175 |
| 2004/0068208 A1 * | 4/2004 | Cimino et al. .................... | 601/2 |
| 2006/0045060 A1 * | 3/2006 | Miyazaki et al. ............. | 370/338 |
| 2006/0119572 A1 | 6/2006 | Lanier | |
| 2006/0229034 A1 * | 10/2006 | Gizis et al. ...................... | 455/95 |
| 2007/0269001 A1 * | 11/2007 | Maschke .......................... | 378/38 |
| 2007/0291109 A1 * | 12/2007 | Wang et al. ................. | 348/14.05 |
| 2008/0009728 A1 * | 1/2008 | Malchow et al. ............. | 600/437 |
| 2008/0179115 A1 | 7/2008 | Ohm et al. | |

OTHER PUBLICATIONS

U.S. Appl. No. 12/654,530, filed Dec. 22, 2009, Byung Kwon Choi et al., Samsung Electronics Co., Ltd.
Office Action dated Feb. 12, 2013, from U.S. Appl. No. 12/654,530.
U.S. Final Office Action dated Aug. 6, 2013 from U.S. Appl. No. 12/654,530.

* cited by examiner

*Primary Examiner* — Ian Jen
(74) *Attorney, Agent, or Firm* — Staas & Halsey LLP

(57) ABSTRACT

Disclosed is a robot setting a display unit corresponding to an eye level of the user. The robot includes a body unit, a display unit, and at least one sliding section. The display unit is provided with a detection unit, which detects a position of a user, to rotate together with the body unit according to an eye level of the user. The sliding section connects the body unit with the display unit such that the body unit and the display unit rotate longitudinally and transversely according to a detection result of the detection unit.

20 Claims, 8 Drawing Sheets

ROBOT

CROSS-REFERENCE TO RELATED APPLICATIONS

This application claims the benefit of Korean Patent Application No. 10-2009-0005443, filed on Jan. 22, 2009, in the Korean Intellectual Property Office, the disclosure of which is incorporated herein by reference.

BACKGROUND

1. Field

The embodiment relates to a robot. More particularly, the embodiment relates to a robot capable of improving affinity with a user by setting a display unit corresponding to an eye level of the user.

2. Description of the Related Art

In general, a robot stores various pieces of information, such as information necessary for an operation, in a body unit. The information stored in the body unit can be displayed through a display unit fixed to the body unit under the control of a user.

However, according to the conventional robot, since the display unit is fixed to the body unit at a predetermined height, the eyes of a user may not meet with the display unit fixed at the predetermined height.

Thus, even if a user watches the display unit by pointing his/her eyes upon the robot while manipulating the robot at a close distance, since the display unit does not meet the eyes of the user, the user may not read information displayed on the display unit.

Further, when a user is tall, since the eyes of the user are positioned higher than the display unit, the user must bend down such that the eyes of the user meet the display unit. Further, when a user is short, since eyes of the user are positioned lower than the display unit, the user must raise the head toward the display unit.

However, currently used entertainment robots have various heights according to purposes thereof. The entertainment robots must be transformed in various postures in order to allow persons having various poses to use the robots, but such transformation of the robot cannot be achieved with the current robots.

In this regard, it is necessary to provide a friendly robot having a display unit which can rotate according to an eye level of a user. In detail, the display unit must meet with eyes of the user such that the robot can easily communicate with the user at a closer distance. In more detail, the degree of freedom and flexibility of the robot must be improved while the robot is moving to mate the display unit with the eyes of the user.

SUMMARY

Accordingly, it is an aspect to provide a robot including a display unit, capable of rotating the display unit frontward, rearward, clockwise or counterclockwise to allow the display unit to meet with the eyes of a user.

Another aspect is to provide a robot including a display unit, capable of improving affinity with a user by improving the degree of freedom and flexibility of the display unit while the robot is moving, to thereby meet the display unit with the eyes of the user.

Additional aspects and/or advantages will be set forth in part in the description which follows and, in part, will be apparent from the description, or may be learned by practice.

The foregoing and/or other aspects are achieved by providing a robot including a body unit, a display unit, and at least one sliding section. The display unit includes a detection unit, which detects a position of a user, to rotate together with the body unit according to an eye level of the user. The sliding section connects the body unit with the display unit such that the body unit and the display unit rotate longitudinally and transversely according to a detection result of the detection unit.

Further, the sliding section includes a first sliding section connected with the body unit, and a second sliding section connected with the first sliding section such that the second sliding section slidably moves in the first sliding section up and down.

Further, the first and second sliding sections are coupled with at least one sliding unit.

Further, the sliding unit includes a ball screw fixed to the first sliding section, and a ball nut coupled with the ball screw while being fixed to the second sliding section.

Further, the robot includes at least one first fan tilt driving unit that connects the body unit with the first sliding section. The first fan tilt driving unit rotates the first and second sliding sections and the display unit longitudinally and transversely.

Further, the robot includes at least one second fan tilt driving unit that connects the second sliding section with the display unit. The second fan tilt driving unit rotates the display unit longitudinally and transversely.

Further, the first fan tilt driving unit includes at least one first fan driving unit that rotates the first and second sliding sections and the display unit in clockwise and counterclockwise directions, and at least one first tilt driving unit that rotates the first and second sliding sections and the display unit in front and rear directions.

Further, the second fan tilt driving unit includes at least one second fan driving unit that rotates the display unit in clockwise and counterclockwise directions, and at least one second tilt driving unit that rotates the display unit in front and rear directions.

Further, the first and second tilt driving units have a ratchet structure provided with a solenoid switch.

The foregoing and/or other aspects are achieved by providing a robot including a body unit, at least one sliding section coupled with the body unit to rotate in front and rear directions according to a posture and an eye level of the user, and a display unit coupled with the sliding section to provide a user with information.

Further, the display unit includes a detection unit to detect the posture and eye level of the user.

Further, the sliding section includes a first sliding section connected with the body unit, and a second sliding section connected with the first sliding section through a sliding unit such that the second sliding section slidably moves in the first sliding section up and down.

Further, the body unit and the sliding section are connected with at least one first fan tilt driving unit, and the sliding section and the display unit are connected with at least one second fan tilt driving unit.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
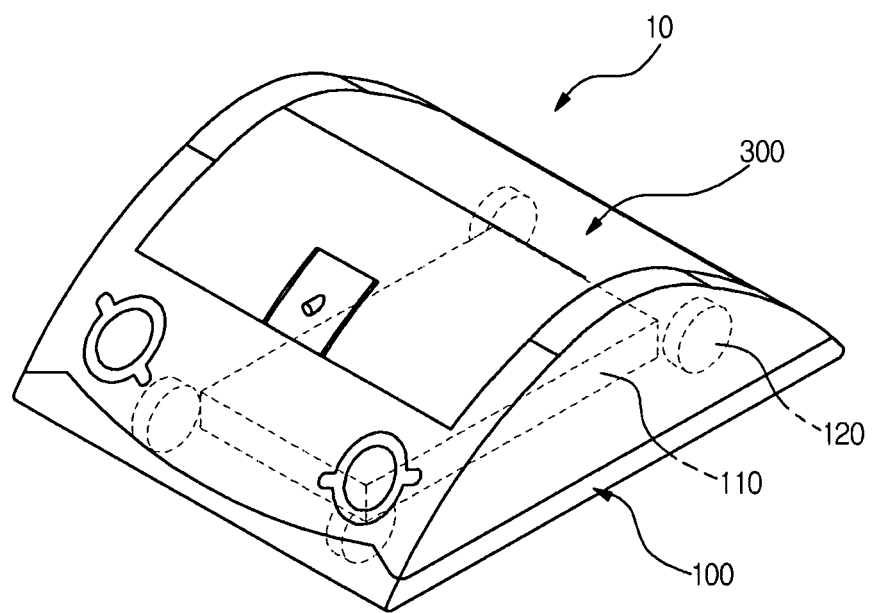
FIG. 1 is a perspective view illustrating a standby state of a robot according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, an embodiment will be described in detail with reference to accompanying drawings.

Figure 2:
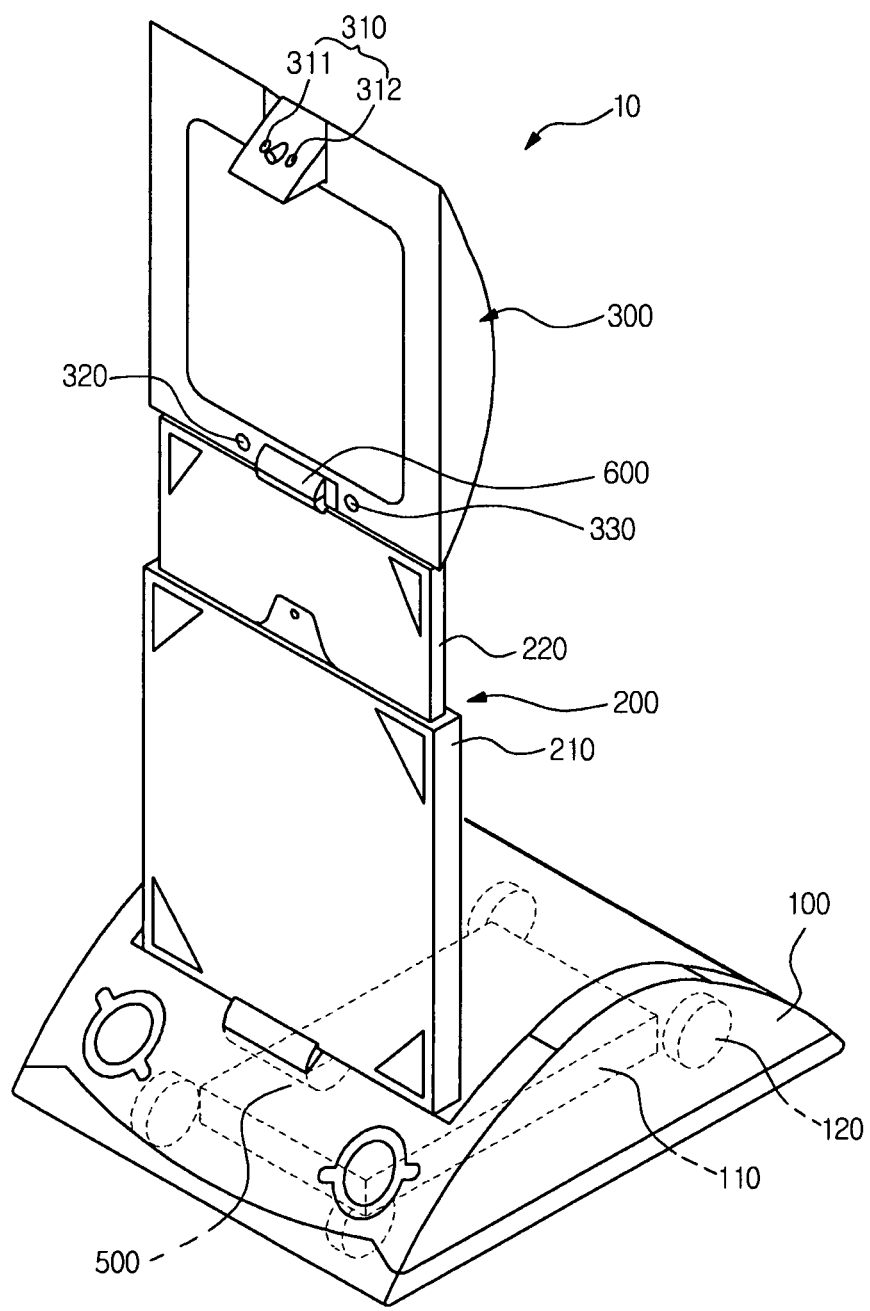
FIG. 2 is a perspective view illustrating one posture of a robot according to an embodiment.
Figure 3:
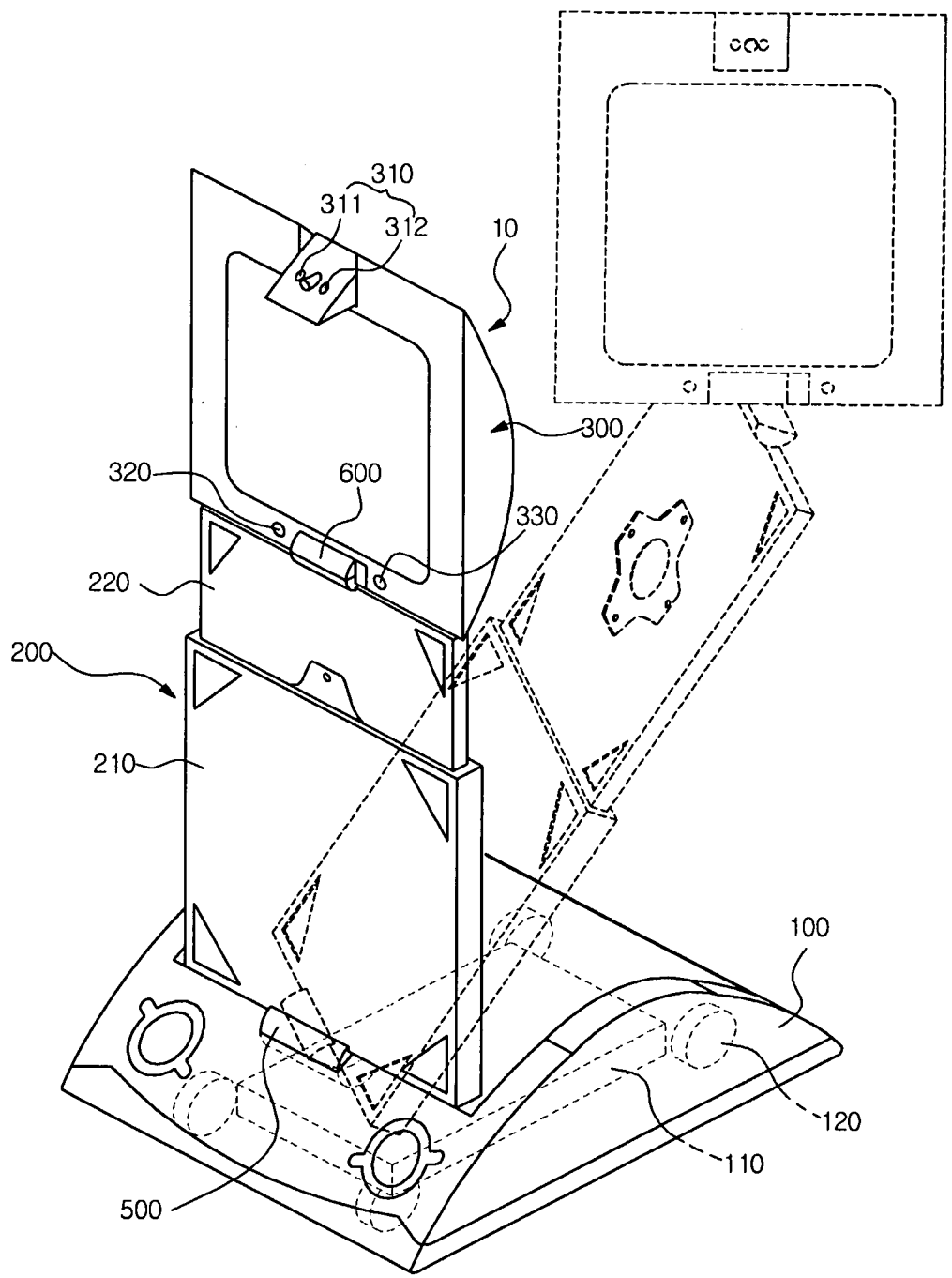
FIG. 3 is a perspective view illustrating a fan and tilt operation state of a robot according to an embodiment.

FIG. 1 is a perspective view illustrating a standby state of a robot according to an embodiment, FIG. 2 is a perspective view illustrating one posture of the robot according to the embodiment, and FIG. 3 is a perspective view illustrating a fan and tilt operation state of the robot according to the embodiment.

As illustrated in FIGS. 1 to 3, the robot 10 according to the embodiment repeats a standby state and at least one movement state.

The robot 10 includes a body unit 100, a sliding section 200 coupled with the body unit 100 and having a length varying depending on an eye level of a user, and a display unit 300 coupled with the sliding section 200 to provide the user with various pieces of information.

The body unit 100 includes a control unit 110, which controls positions and various operations of the robot 10, and movable units 120 operating under the control of the control unit 110.

The control unit 110 controls operations of a sliding unit 400 and at least two fan tilt driving units 500 and 600, which will be described later, according to the eye level of the user. Further, the control unit 110 controls an operation of the movable units 120 and may include all necessary units, such as communication units, capable of communicating with other PCs or robots.

The movable units 120 can move the robot 10 under the control of the control unit 110. The movable units 120 can be prepared in the form of wheels or belts and are installed at a bottom surface of the robot 10 such that the robot 10 can move back and forth and from side to side.

The sliding section 200 includes a first sliding section 210 connected with the body unit 100, and a second sliding section 220 that slidably moves in the first sliding section 210 such that a length of the second sliding section 220 exposed from the first sliding section 210 may vary. The first and second sliding sections 210 and 220 are coupled with the sliding unit 400.

The display unit 300 is provided with a detection unit 310 to detect the user. The display unit 300 may include a camera 311 and a sensor 312 to detect the posture, eyes and eye level of the user.

The camera 311 is a vision recognition camera employing a well-known vision recognition technology and detects the face of the user by photographing the user.

The sensor 312 is a distance measurement sensor employing a well-known distance measurement technology and is installed at one side of the camera 311 such that the sensor 312 can move together with the camera 311. Thus, if the camera 311 detects the face of the user, the sensor 312 measures a distance to the sensor 312 from the face of the detected user.

Reference numeral 320 represents a microphone capable of receiving sound of a user and reference numeral 330 represents a speaker capable of outputting sound such that a user can listen to the sound.

Figure 4:
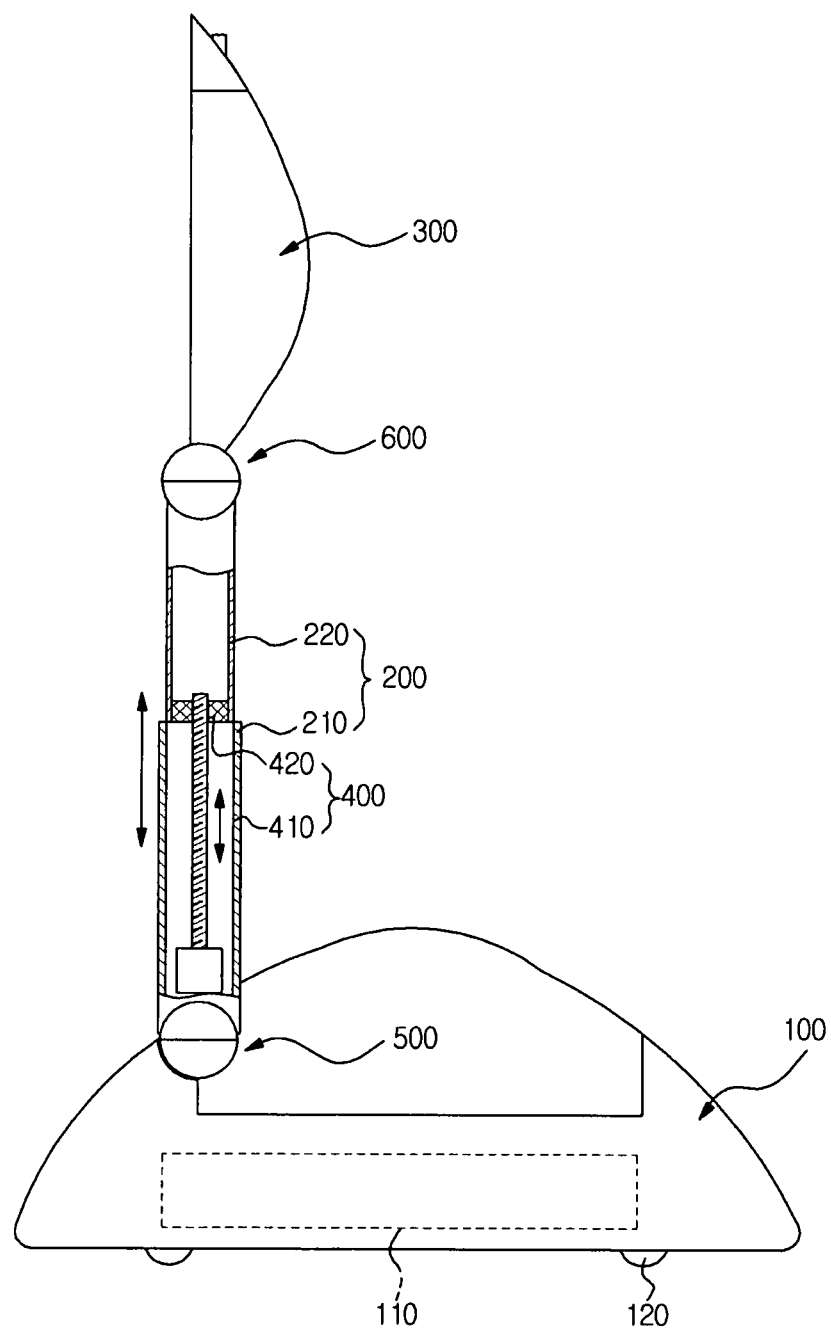
FIG. 4 is a sectional view illustrating a sliding unit of a robot according to an embodiment.
Figure 5:
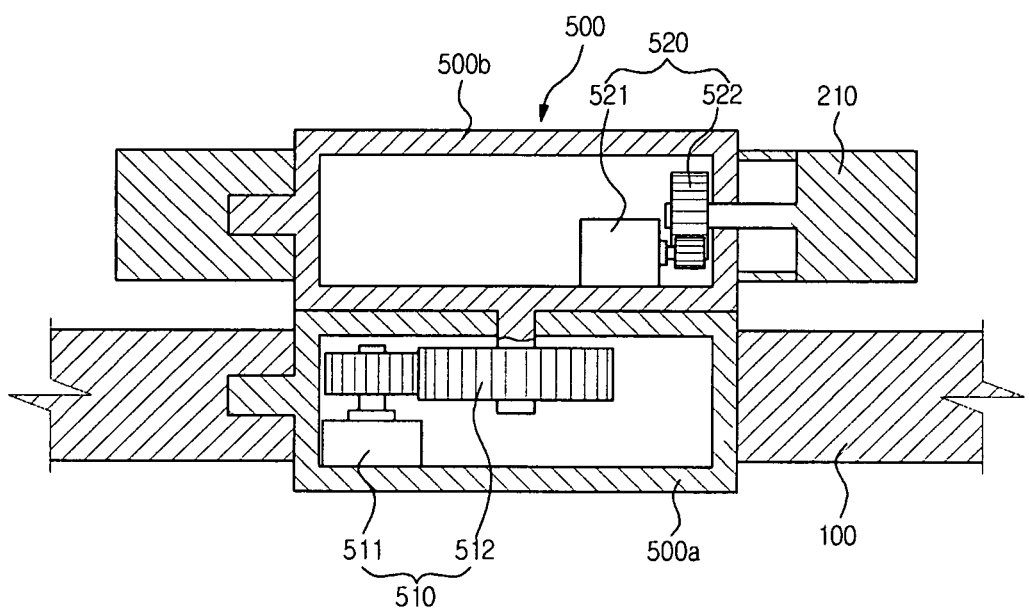
FIG. 5 is a sectional view illustrating a first fan tilt driving unit of a robot according to an embodiment.
Figure 6:
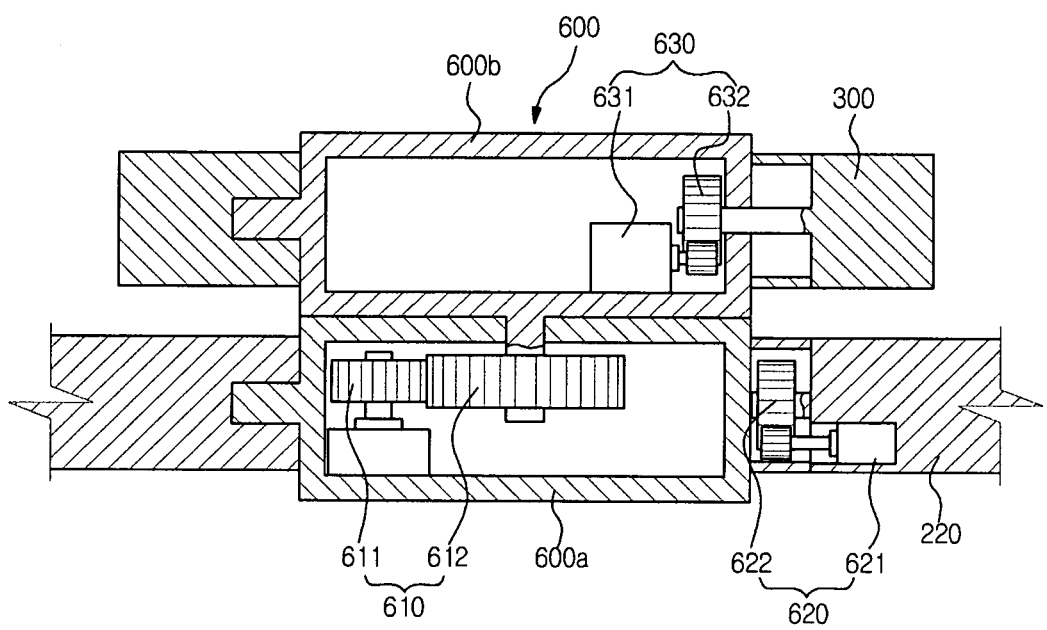
FIG. 6 is a sectional view illustrating a second fan tilt driving unit of a robot according to an embodiment.
Figure 7:
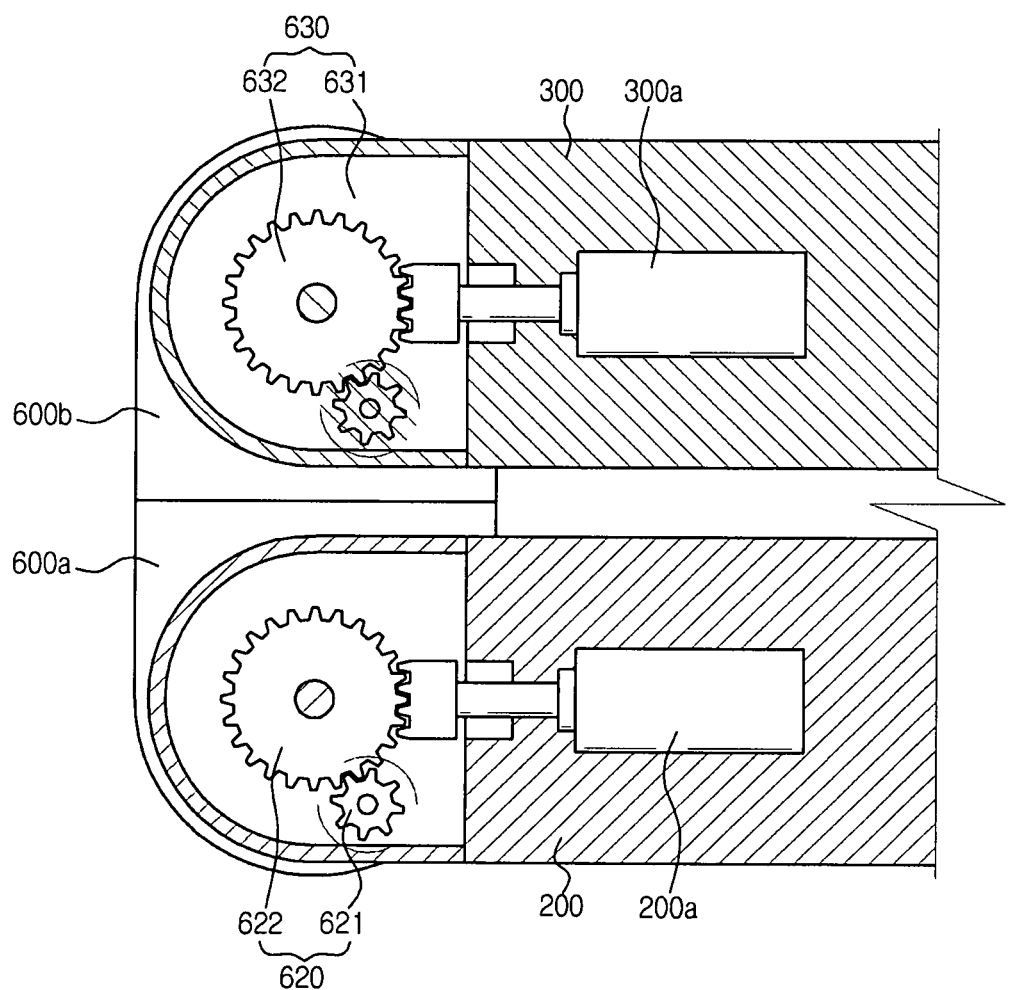
FIG. 7 is a sectional view illustrating a state in which an operation of a tilt driving unit is completed according to an embodiment.
Figure 8:
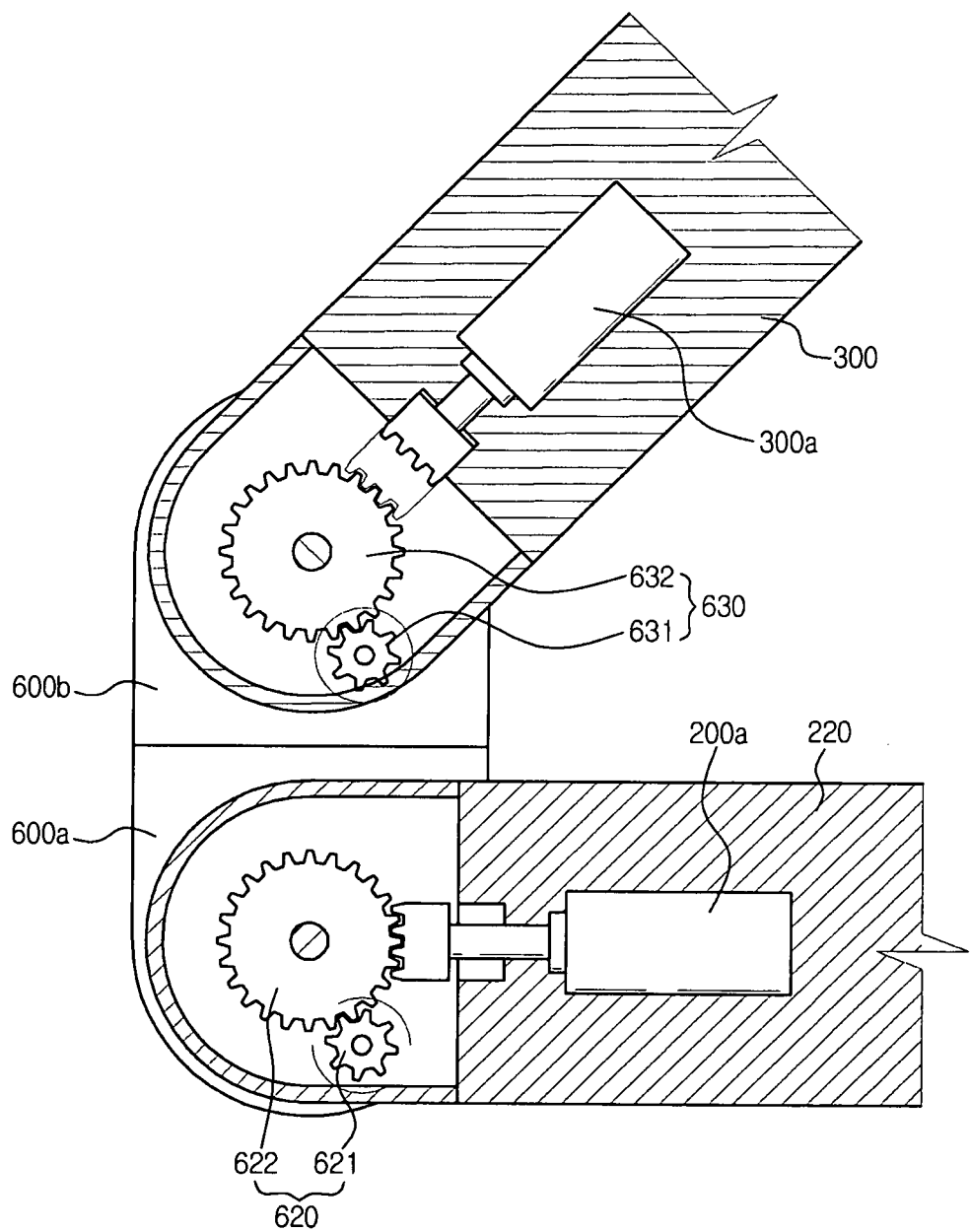
FIG. 8 is a sectional view illustrating a state in which an operation of a tilt driving unit is being performed according to an embodiment.

FIG. 4 is a sectional view illustrating the sliding unit of the robot according to the embodiment, FIG. 5 is a sectional view illustrating a first fan tilt driving unit of the robot, and FIG. 6 is a sectional view illustrating a second fan tilt driving unit of the robot. FIG. 7 is a sectional view illustrating a state in which an operation of a tilt driving unit is completed according to the embodiment, and FIG. 8 is a sectional view illustrating a state in which the operation of the tilt driving unit is being performed according to the embodiment.

As illustrated in FIG. 4, the sliding unit 400 is installed in the sliding section 200 to move the second sliding section 220 relative to the first sliding section 210.

The sliding unit 400 includes a ball screw 410 fixed to the first sliding section 210, a ball nut 420 screw-coupled with the ball screw 410 while being fixed to the second sliding section 220, and a driving motor (not shown) that rotates the ball screw 410.

If the driving motor is driven in one direction under the control of the control unit 110, a shaft of the ball screw 410, which is coupled with a shaft of the driving motor, operates the ball nut 420 while rotating together with the shaft of the driving motor. Thus, the second sliding section 220 fixed to the ball nut 420 can move relative to the first sliding section 210 fixed to the ball screw 410.

As illustrated in FIG. 5, the first fan tilt driving unit 500 is installed between the body unit 100 and the sliding section 200.

The first fan tilt driving unit 500 includes a first fan driving unit 510, which rotates the sliding section 200 and the display unit 300 in the clockwise and counterclockwise directions relative to the body unit 100, and a first tilt driving unit 520 that rotates the sliding section 200 and the display unit 300 in front and rear directions relative to the body unit 100.

The first fan driving unit 510 includes a first fan motor 511 and at least one first fan gear 512 coupled with the first fan motor 511. The first fan motor 511 can be driven in the clockwise or counterclockwise direction to adjust a rotation direction of the display unit 300 according to the posture and eyes of a user.

The first fan gear 512 is gear-coupled with the first fan motor 511 such that the sliding section 200 and the display unit 300 simultaneously rotate in the clockwise and counterclockwise directions.

The first fan motor 511 is fixed to a first lower housing 500a connected with the body unit 100, and the first fan gear 512 is fixed to a first upper housing 500b connected with the first sliding section 210. Thus, as the first fan gear 512 rotates together with the first fan motor 511, the first and second sliding sections 210 and 220 and the display unit 300 rotate in the clockwise and counterclockwise directions.

The first tilt driving unit 520 rotates the sliding section 200 and the display unit 300 in the front and rear directions relative to the body unit 100. The first tilt driving unit 520 includes a first tilt motor 521 and at least one first tilt gear 522 coupled with the first tilt motor 521.

The first tilt gear 522 can rotate in the front and rear directions to adjust a rotation direction of the display unit 300 according to the posture and eye level of the user. The first tilt gear 522 is gear-coupled with the first tilt motor 521 such that the sliding section 200 and the display unit 300 simultaneously rotate in the front and rear directions.

The first tilt motor 521 is fixed to the first upper housing 500b, and the first tilt gear 522 is fixed to the first upper housing 500b while engaging with the first tilt motor 521. Thus, as the first tilt gear 522 rotates together with the first tilt motor 521, the first and second sliding sections 210 and 220 and the display unit 300 rotate in the front and rear directions.

As illustrated in FIG. 6, the second fan tilt driving unit 600 is installed between the sliding section 200 and the display unit 300.

The second fan tilt driving unit 600 includes a second fan driving unit 610, which rotates the display unit 300 in clockwise and counterclockwise directions relative to the body unit 100, and second tilt driving units 620 and 630 that rotate the display unit 300 in front and rear directions relative to the body unit 100.

The second fan driving unit 610 rotates the display unit 300 in the clockwise and counterclockwise directions relative to the body unit 100. The second fan driving unit 610 includes a second fan motor 611 and at least one second fan gear 612 coupled with the second fan motor 611.

The second fan motor 611 can rotate in the clockwise or counterclockwise direction to adjust a rotation direction of the display unit 300 according to the posture and eyes of a user. The second fan gear 612 is gear-coupled with the second fan motor 611 such that the display unit 300 rotates in the clockwise and counterclockwise directions.

The second fan motor 611 is fixed to a second lower housing 600a connected with the second sliding section 220, and the second fan gear 612 is fixed to a second upper housing 600b connected with the display unit 300. Thus, as the second fan gear 612 rotates together with the second fan motor 611, the display unit 300 rotates in the clockwise and counterclockwise directions.

The second tilt driving units 620 and 630 rotate the display unit 300 in the front and rear directions relative to the body unit 100.

In detail, the second tilt driving units 620 and 630 represent a second lower tilt driving unit connected with the second sliding section 220, and a second upper tilt driving unit connected with the display unit 300.

The second lower tilt driving unit 620 includes a second lower tilt motor 621 and a second lower tilt gear 622 coupled with the second lower tilt motor 621. The second upper tilt driving unit 630 includes a second upper tilt motor 631 and a second upper tilt gear 632 coupled with the second upper tilt motor 631.

The second lower tilt motor 621 and the second upper tilt motor 631 are fixed to the second sliding section 220 and the second upper housing 600b, respectively. The second lower tilt gear 622 and the second upper tilt gear 632 are fixed to the second sliding section 220 and the second upper housing 600b while engaging with the second lower tilt motor 621 and the second upper tilt motor 631, respectively.

As illustrated in FIGS. 7 and 8, since the second lower tilt gear 622 or the second upper tilt gear 632, which rotates in the front and rear directions, has a ratchet structure, the second lower tilt gear 622 or the second upper tilt gear 632 is fixed using a solenoid switch 200a or 300a after a predetermined time lapses, so that the display unit 300 can be inclined with respect to the second sliding section 220 at a predetermined inclination angle.

Further, the first tilt gear 522 employs the ratchet structure using the solenoid switch 200a or 300a, so that the first tilt gear 522 can be inclined with respect to the body unit 100 at a predetermined inclination angle.

Thus, the robot 10 can rotate the display unit 300 longitudinally and transversely such that the display unit 300 can meet with the eyes and eye level of a user. In this way, the degree of freedom and flexibility of the display unit 300 can be improved, so that affinity of the robot 10 with the user can be improved.

Hereinafter, the operation of the robot according to the embodiment will be described.

If a user calls the robot 10 through touch, gesture or sound, the robot 10 according to the embodiment finds the user. Next, the robot 10 detects a face of the user by using the detection unit 310 installed at the display unit 300 and recognizes a posture of the user. In detail, the posture of the user may include a standing posture, a seated posture or a lying posture.

Further, the robot 10 recognizes the face of the user to determine if the user is a registered user. If the user is the registered user, the robot 10 is transformed in correspondence with a memorized posture of the user to provide the user with a service.

However, if the user is not the registered user, the robot 10 must mate with eyes of the user. To this end, the robot 10 detects the face of the user and is directed toward the face of the user. Further, the robot 10 finds a detection point and analyzes the eye level of the user using the detection unit 310.

Then, the robot 10 determines the length of the sliding section 200, which will be used according to the eye level of the user. At this time, the length of the sliding section 200 is determined based on the eye level of the user.

In detail, the development length of the sliding section 200 is determined according to the eye level of the user. For example, as shown in FIG. 3 in solid lines, when the user is a short child, the length of the sliding section 200 is adjusted to mate with the eye level of the short child.

Further, as shown in FIG. 3 in dotted lines, when the user is a tall adult, the second sliding section 220 is maximally expanded from the first sliding section 210 such that the position of the display unit 300 can meet the eye level of the tall adult. Furthermore, the robot 10 according to the embodiment can perform various operations using the sliding section 200 and the fan tilt driving units 500 and 600 according to the posture, eye level and eyes of the user.

As shown in FIGS. 2 and 3, after the display unit 300 meet the eye level of the user, the robot 10 maintains the posture to provide the user with various services according to instructions of the user. Then, if the service is completed, the robot 10 returns to the standby state, as shown in FIG. 1.

As described above, the robot can rotate the display unit longitudinally and transversely such that the display unit can meet the eye level and eyes of the user, and the degree of freedom and flexibility of the robot can be improved.

Although a few embodiments have been shown and described, it would be appreciated by those skilled in the art that changes may be made in these embodiments without departing from the principles and spirit of the embodiment, the scope of which is defined in the claims and their equivalents.

What is claimed is:

1. A robot comprising:
   a body unit;
   a display unit including a detection unit to detect a position and an eye level of a user, the display unit rotating together with the body unit in response to the detected eye level of the user; and
   at least one sliding section that connects the body unit with the display unit such that the body unit and the display unit rotate longitudinally and transversely in response to the detected eye level of the user.

2. The robot of claim 1, wherein the sliding section comprises:
   a first sliding section connected with the body unit; and
   a second sliding section connected with the first sliding section such that the second sliding section slidably moves up and down in the first sliding section.

3. The robot of claim 2, further comprising a sliding unit to couple the first and second sliding sections.

4. A robot comprising:
   a body unit;
   a display unit including a detection unit, which detects a position of a user, to rotate together with the body unit according to an eye level of the user;
   at least one sliding section that connects the body unit with the display unit such that the body unit and the display unit rotate longitudinally and transversely according to a detection result of the detection unit, wherein the at least one sliding section comprises:
      a first sliding section connected with the body unit and a second sliding section connected with the first sliding section such that the second sliding section slidably moves up and down in the first sliding section; and
   a sliding unit to couple the first and second sliding sections, wherein the sliding unit comprises:
   a ball screw fixed to the first sliding section; and
   a ball nut coupled with the ball screw while being fixed to the second sliding section.

5. A robot comprising:
   a body unit;
   a display unit including a detection unit, which detects a position of a user, to rotate together with the body unit according to an eye level of the user;
   at least one sliding section that connects the body unit with the display unit such that the body unit and the display unit rotate longitudinally and transversely according to a detection result of the detection unit, wherein the at least one sliding section comprises:
      a first sliding section connected with the body unit and a second sliding section connected with the first sliding section such that the second sliding section slidably moves up and down in the first sliding section; and
      at least one first fan tilt driving unit that connects the body unit with the first sliding section, wherein the first fan tilt driving unit rotates the first and second sliding sections and the display unit longitudinally and transversely.

6. A robot comprising:
   a body unit;
   a display unit including a detection unit, which detects a position of a user, to rotate together with the body unit according to an eye level of the user;
   at least one sliding section that connects the body unit with the display unit such that the body unit and the display unit rotate longitudinally and transversely according to a detection result of the detection unit, wherein the at least one sliding section comprises:
      a first sliding section connected with the body unit and a second sliding section connected with the first sliding section such that the second sliding section slidably moves up and down in the first sliding section; and
      at least one second fan tilt driving unit that connects the second sliding section with the display unit, wherein the second fan tilt driving unit rotates the display unit longitudinally and transversely.

7. The robot of claim 5, wherein the first fan tilt driving unit comprises:
   at least one first fan driving unit that rotates the first and second sliding sections and the display unit in clockwise and counterclockwise directions; and
   at least one first tilt driving unit that rotates the first and second sliding sections and the display unit in front and rear directions.

8. The robot of claim 6, wherein the second fan tilt driving unit comprises:
   at least one second fan driving unit that rotates the display unit in clockwise and counterclockwise directions; and
   at least one second tilt driving unit that rotates the display unit in front and rear directions.

9. The robot of claim 7, wherein the first tilt driving unit has a ratchet structure provided with a solenoid switch.

10. A robot comprising:
    a body unit;
    at least one sliding section coupled with the body unit to rotate in a clockwise or counterclockwise direction about a vertical axis relative to the body unit, in response to a posture or eye level of a user detected by the robot; and
    a display unit coupled with the sliding section to provide the user with information.

11. The robot of claim 10, wherein the display unit comprises a detection unit to detect the posture and eye level of the user.

12. The robot of claim 10, wherein the sliding section comprises:
    a sliding unit;
    a first sliding section connected with the body unit; and
    a second sliding section connected with the first sliding section through the sliding unit such that the second sliding section slidably moves up and down in the first sliding section.

13. A robot comprising:
    a body unit;
    at least one sliding section coupled with the body unit to rotate in front and rear directions according to a posture and an eye level of the user;
    a display unit coupled with the sliding section to provide a user with information; and
    first and second fan tilt driving units, wherein the body unit and the sliding section are connected with the first fan tilt driving unit, and the sliding section and the display unit are connected with the second fan tilt driving unit.

14. The robot of claim 8, wherein the second tilt driving unit has a ratchet structure provided with a solenoid switch.

15. The robot of claim 1, wherein upon detecting the position of the user, the robot controls the display unit to rotate in a direction such that a position of the display unit corresponds to an eye level of the user.

16. The robot of claim 1, wherein the sliding section comprises:
    a first sliding section connected to the body unit; and
    a second sliding section connected to the first sliding section, wherein the second sliding section retracts into a space of the first sliding section to conceal the second sliding section or is extracted out of the first sliding section to expose the second sliding section, in response to the detected eye level of the user.

17. The robot of claim 10, wherein the display unit rotates in a clockwise or counterclockwise direction about a vertical axis relative to the body unit, in response to a posture or eye level of the user, detected by the robot.

18. The robot of claim 10, wherein the display unit rotates about the at least one sliding section in front and rear directions relative to the body unit, and the at least one sliding section rotates about the body unit in front and rear directions relative to the body unit, in response to a posture or eye level of the user, detected by the robot.

19. The robot of claim 11, wherein upon detecting the posture and eye level of the user, the robot controls the display unit to rotate such that a position of the display unit corresponds to an eye level of the user.

20. The robot of claim 11, wherein the detection unit determines whether the user is a registered user, and if the user is a registered user, the robot adjusts the at least one sliding section according to a stored posture of the registered user.

* * * * *